US007230525B2

(12) United States Patent
Hirai

(10) Patent No.: US 7,230,525 B2
(45) Date of Patent: Jun. 12, 2007

(54) TIRE AIR PRESSURE MONITORING SYSTEM

(75) Inventor: Toru Hirai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 205 days.

(21) Appl. No.: 11/178,604

(22) Filed: Jul. 12, 2005

(65) Prior Publication Data

US 2006/0012469 A1 Jan. 19, 2006

(30) Foreign Application Priority Data

Jul. 15, 2004 (JP) ............................. 2004-208401

(51) Int. Cl.
*B60C 23/00* (2006.01)
(52) U.S. Cl. ...................... 340/447; 340/445; 73/146.4
(58) Field of Classification Search ........ 340/445–447, 340/442; 73/146.3–4, 146.8
See application file for complete search history.

(56) References Cited

U.S. PATENT DOCUMENTS

| 6,435,020 | B1 * | 8/2002 | Oldenettel et al. ......... 73/146.4 |
| 2002/0101340 | A1 | 8/2002 | Starkey |
| 2003/0001735 | A1 | 1/2003 | Honeck et al. |
| 2003/0020604 | A1 | 1/2003 | Fischer et al. |
| 2003/0020605 | A1 | 1/2003 | Starkey |
| 2003/0107481 | A1 | 6/2003 | Sawafuji |
| 2004/0021562 | A1 | 2/2004 | Prenninger |

FOREIGN PATENT DOCUMENTS

| EP | 1052119 A | 11/2000 |
| JP | 2003-175711 A | 6/2003 |

OTHER PUBLICATIONS

Shuichi Iwatsubo; Suryokaho No Kiso: Jun. 20, 1987; pp. 14-23; Asakura Shoten, Japan.

* cited by examiner

*Primary Examiner*—Jeffery Hofsass
*Assistant Examiner*—Shirley Lu
(74) *Attorney, Agent, or Firm*—Global IP Counselors, LLP

(57) ABSTRACT

A tire air pressure monitoring system is provided that comprises a transmitting device, a receiving device, and a tire identification number registration device. The transmitting device is mounted on a wheel of a vehicle, and configured and arranged to wirelessly transmit a signal indicative of at least tire air pressure information of a tire coupled to the wheel and a tire identification number assigned to the wheel. The receiving device is mounted on the vehicle, and configured and arranged to receive the signal transmitted from the transmitting device. The tire identification number registration device is configured to estimate a position of the wheel with respect to the vehicle based on correlation information corresponding to an extent of a correlation between strength of the signal and a tire rotational angle of the wheel, and to register the tire identification number with the position of the wheel.

19 Claims, 15 Drawing Sheets

| $W_2$ | ID | $MOD_{FL}$ | $MOD_{FR}$ | $MOD_{RL}$ | $MOD_{RR}$ | RSSI |
|---|---|---|---|---|---|---|
| 1 | 1001 | 33 | 33 | 32 | 32 | 1.485 |
| 11 | 1003 | 12 | 10 | 25 | 8 | 1.77 |
| 13 | 1002 | 16 | 30 | 29 | 34 | 1.21 |
| 18 | 1004 | 1 | 41 | 3 | 39 | 1.40 |
| 21 | 1001 | 21 | 21 | 20 | 20 | 1.975 |
| 24 | 1003 | 40 | 19 | 31 | 29 | 1.04 |
| 25 | 1002 | 35 | 43 | 0 | 8 | 1.04 |
| 31 | 1004 | 34 | 23 | 36 | 2 | 1.03 |
| 35 | 1001 | 10 | 10 | 8 | 8 | 1.090 |
| 42 | 9999 | 39 | 17 | 4 | 38 | 1.04 |
| 46 | 1003 | 15 | 17 | 21 | 22 | 1.55 |
| 57 | 1002 | 35 | 43 | 0 | 8 | 2.98 |
| ⋮ | ⋮ | ⋮ | ⋮ | ⋮ | ⋮ | ⋮ |
| 777 | 1001 | 13 | 40 | 22 | 36 | 1.694 |
| 783 | 1004 | 38 | 28 | 35 | 40 | 1.94 |
| 786 | 1002 | 39 | 17 | 4 | 38 | 2.45 |
| 792 | 1004 | 38 | 28 | 35 | 40 | 1.94 |
| 798 | 1001 | 39 | 22 | 3 | 17 | 1.617 |

Fig. 7

| ID | RECEPTION CYCLE |
|---|---|
| 0001 | 2 |
| ⋮ | ⋮ |
| 1001 | 131 |
| 1002 | 132 |
| 1003 | 135 |
| 1004 | 130 |
| 1005 | 127 |
| ⋮ | ⋮ |
| 9999 | 67 |

Fig. 8

| MOD$_{FL}$ | RSSI |
|---|---|
| 33 | 1.485 |
| 21 | 1.975 |
| 10 | 1.090 |
| 43 | 1.778 |
| 32 | 1.687 |
| 22 | 2.026 |
| 11 | 1.433 |
| 1 | 1.708 |
| 35 | 0.285 |
| ⋮ | ⋮ |
| 23 | 2.048 |
| 6 | 1.534 |
| 32 | 1.564 |
| 13 | 1.694 |
| 39 | 1.617 |

Fig. 9(a)

| MOD$_{FL}$ | RSSI |
|---|---|
| MOD(1) | RSSI(1) |
| MOD(2) | RSSI(2) |
| MOD(3) | RSSI(3) |
| MOD(4) | RSSI(4) |
| MOD(5) | RSSI(5) |
| MOD(6) | RSSI(6) |
| MOD(7) | RSSI(7) |
| MOD(8) | RSSI(8) |
| MOD(9) | RSSI(9) |
| ⋮ | ⋮ |
| MOD(M-4) | RSSI(M-4) |
| MOD(M-3) | RSSI(M-3) |
| MOD(M-2) | RSSI(M-2) |
| MOD(M-1) | RSSI(M-1) |
| MOD(M) | RSSI(M) |

Fig. 9(b)

|  | ID | $\eta_{FL}^2$ | $\eta_{FR}^2$ | $\eta_{RL}^2$ | $\eta_{RR}^2$ |
|---|---|---|---|---|---|
| ID(1) | 1001 | 0.954 | 0.429 | 0.278 | 0.262 |
| ID(2) | 1002 | 0.295 | 0.971 | 0.381 | 0.315 |
| ID(3) | 1003 | 0.257 | 0.287 | 0.937 | 0.450 |
| ID(4) | 1004 | 0.459 | 0.303 | 0.300 | 0.964 |
| ID(5) | 1005 | 0.294 | 0.276 | 0.307 | 0.270 |
| ID(j) | ⋮ | ⋮ | ⋮ | ⋮ | ⋮ |
| ID(M) | 9999 | 0.220 | 0.422 | 0.364 | 0.235 |

Fig. 10

| FL | FR | RL | RR |
|---|---|---|---|
| 1001 | 1002 | 1003 | 1004 |

Fig. 11

TIRE AIR PRESSURE MONITORING SYSTEM

CROSS-REFERENCE TO RELATED APPLICATIONS

This application claims priority to Japanese Patent Application No. 2004-208401. The entire disclosure of Japanese Patent Application No. 2004-208401 is hereby incorporated herein by reference.

BACKGROUND OF THE INVENTION

1. Field of the Invention

The present invention relates to a tire air pressure monitoring system configured and arranged to estimate positions of wheels with respect to a vehicle based on electrical waves received by a receiver that is configured and arranged to receive radio waves from transmitters respectively coupled to the wheels.

2. Background Information

Japanese Laid-Open Patent Publication No. 2003-175711 discloses a conventional tire air pressure monitoring system in which a reception device for processing received data is configured and arranged to identify a wheel provided with a transmitter when the transmitter sends radio wave based on a voltage pattern induced in a receiving antenna of the reception device by the radio wave from the transmitter.

In view of the above, it will be apparent to those skilled in the art from this disclosure that there exists a need for an improved tire air pressure monitoring system. This invention addresses this need in the art as well as other needs, which will become apparent to those skilled in the art from this disclosure.

SUMMARY OF THE INVENTION

The conventional tire air pressure monitoring system is configured to identify positions of each wheel with a transmitter from which the radio wave is transmitted by comparing a variation pattern of radio wave strength that is stored in advance and a variation pattern of radio wave strength received by the reception device from each transmitter. Therefore, if tires or wheels are mounted that have different shapes or materials from those presumed when the variation pattern of the radio wave strength was originally stored, sometimes the variation pattern of the radio wave strength varies even if the radio wave is transmitted from the same wheel position. As a result, there is a possibility that the positions of the four tires cannot be identified based on the radio wave transmitted from each transmitter.

The present invention was designed in view of the problems described above. One object of the present invention is to provide a tire air pressure monitoring system in which there is no need to store the variation pattern of the radio wave strength in advance, and the positions of the wheels can be reliable estimated even if various tires or wheels with different shapes or materials are mounted to the vehicle.

In order to achieve the above mentioned and other objects of the present invention, a tire air pressure monitoring system is provided that comprises a transmitting device, a receiving device, and a tire identification number registration device. The transmitting device is mounted on a wheel of a vehicle, and configured and arranged to wirelessly transmit a signal indicative of at least tire air pressure information of a tire coupled to the wheel and a tire identification number assigned to the wheel. The receiving device is mounted on the vehicle, and configured and arranged to receive the signal transmitted from the transmitting device. The tire identification number registration device is configured to estimate a position of the wheel with respect to the vehicle based on correlation information corresponding to an extent of a correlation between strength of the signal received in the receiving device and a tire rotational angle of the wheel, and to register the tire identification number with the position of the wheel with respect to the vehicle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 7 is a diagram illustrating an example of acquired data stored in a data acquisition unit of the tire air pressure monitoring system in accordance with the first embodiment of the present invention;

FIG. 8 is a diagram illustrating an example of tabulated data stored in the data acquisition unit of the tire air pressure monitoring system in accordance with the first embodiment of the present invention;

FIG. 9(a) is a diagram illustrating an example of data pertaining to an ID number ID(1) extracted by a correlation calculation unit of the tire air pressure monitoring system in accordance with the first embodiment of the present invention;

FIG. 9(b) is a diagram illustrating an example of data pertaining to the ID number ID(1) in which the data is arranged in the order of a remainder indicating a tire rotational angle and assigned with labels in accordance with the first embodiment of the present invention;

FIG. 10 is a diagram showing an example of correlation ratio data in which the results calculated by the correlation calculation unit are stored in accordance with the first embodiment of the present invention;

FIG. 11 is a diagram illustrating an example of an arrangement of ID registration information in which the results obtained in an ID learning unit are stored in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
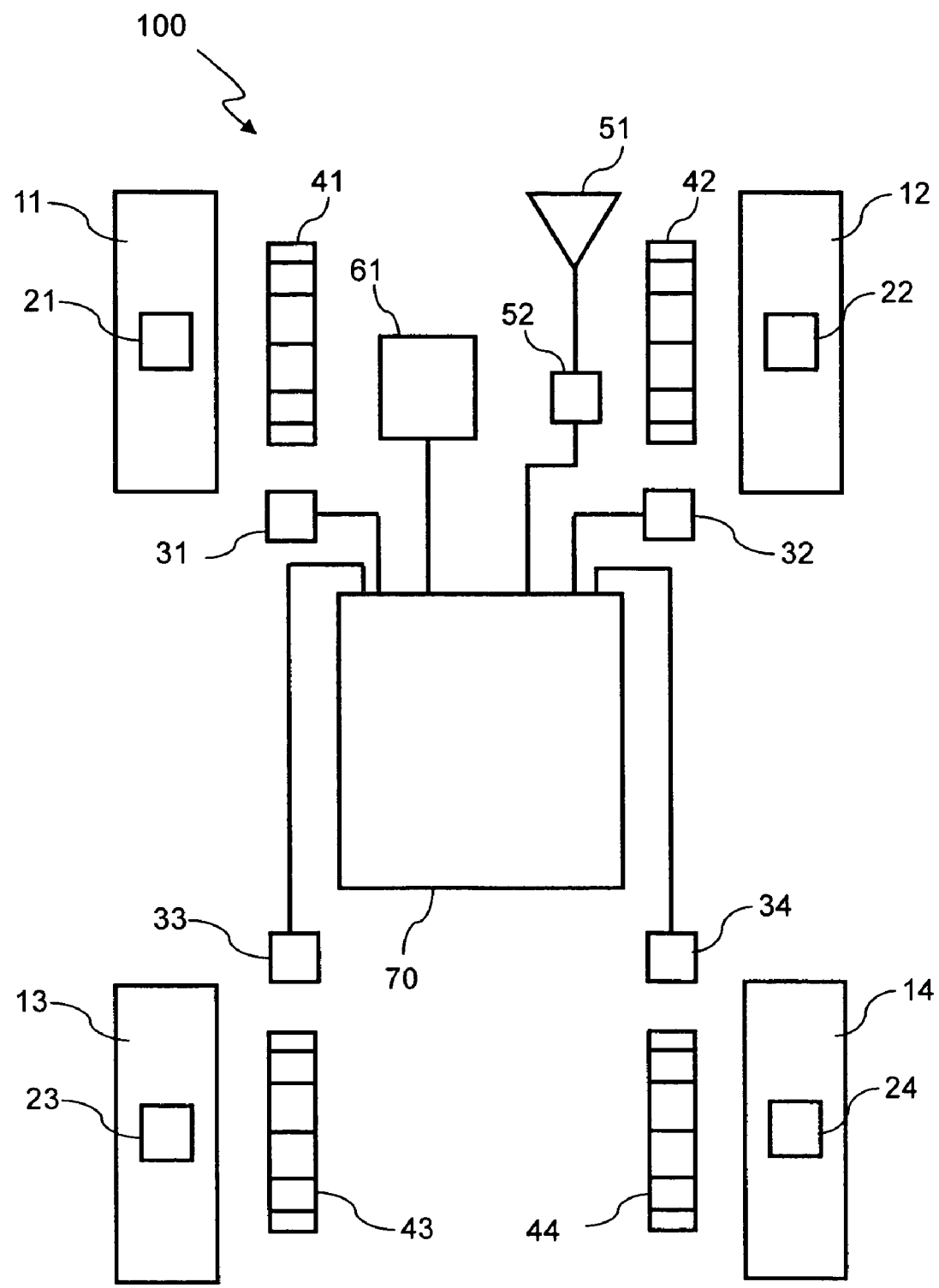
FIG. 1 is a diagrammatic view of a tire air pressure monitoring system in accordance with a first embodiment of the present invention.

Referring initially to FIG. 1, a tire air pressure monitoring system is illustrated in accordance with a first embodiment of the present invention. FIG. 1 is a diagrammatic view of a tire air pressure alarm system 100 in which the tire air pressure monitoring system in accordance with the first embodiment is adapted. The tire air pressure alarm system 100 is configured to determine whether at least one of tire air pressures of the tires of a plurality of wheels (a FL (front left) wheel 11, a FR (front right) wheel 12, a RL (rear left) wheel 13 and a RR (rear right) wheel 14) has decreased based on the information detected by a plurality of TPMS transmitters 21, 22, 23 and 24 (transmitting devices), mounted to the wheels 11, 12, 13 and 14, respectively. When the tire air pressure alarm system 100 determines there is tire air pressure decrease in one of the tires 11, 12, 13 and 14, the tire air pressure alarm system 100 is configured to display a position of a wheel corresponding to the information pertaining to a decrease in the tire air pressure on a display device 61.

Specifically, the TPMS transmitters 21, 22, 23, and 24 are configured and arranged to detect the tire air pressure of the tires 11, 12, 13, and 14, respectively, at each wheel position, to convert the tire air pressure obtained by the detection to the baseband signal of an electrical signal along with information indicative of a tire identification number (hereinafter referred as "ID number") that is uniquely assigned to the TPMS transmitters 21, 22, 23, and 24, and to modulate carrier waves with the baseband signal to and transmit the radio or electric wave. Conventional systems and/or prescribed values are used for the format of the baseband signal, the transmission line code, the transmission type, frequency, and bandwidth of the carrier waves, and the intervals at which the radio waves are transmitted. The baseband signal may include the tire temperature and other types of information other than the tire air pressure and the ID number.

The radio waves transmitted from the TPMS transmitters 21, 22, 23, and 24 are received by a receiving antenna 51 and a receiver 52 (receiving device) mounted on the vehicle, and are demodulated by the receiver 52 according to a predetermined demodulation format. RSSI (Received Signal Strength Indicator) information indicating the strength of the received radio waves, and the tire air pressure information and the ID number information contained in the baseband signal are outputted to a controller 70 (tire identification number registration device). The receiver 52 on the vehicle side includes a circuit for sending out trigger waves (for example, 2.4 GHz radio waves) from the receiving antenna 51 according to the data requirements. Each of the TPMS transmitters 21, 22, 23, and 24 on the wheel side has a circuit configured to send back the tire air pressure and temperature information with the ID number without using a battery by the trigger wave sent out from the receiving antenna 51. TPMS is an abbreviation for Tire Pressure Monitor System.

Furthermore, as seen in FIG. 1, the wheels 11, 12, 13 and 14 are provided with wheel speed sensors 31, 32, 33, and 34, respectively, and sensor rotors 41, 42, 43, and 44, respectively, facing each other in a corresponding manner. The sensor rotors 41, 42, 43, and 44 are mounted on axles (not shown) of the wheels 11, 12, 13 and 14 so that the sensor rotors 41 rotate in conjunction with the corresponding one of the wheels 11, 12, 13, and 14 disposed in the corresponding position. Each of the sensor rotors 41, 42, 43 and 44 includes a plurality of teeth to form uniformly concavoconvex surface on the periphery surface of the sensor rotor 41, 42, 43, or 44. Thus, each of the wheel speed sensors 31, 32, 33, and 34 provided to the vehicle is configured to output a pulse signal (hereinafter referred to as a "vehicle speed pulse") to the controller 70 when a tooth of the corresponding one of the sensor rotors 41, 42, 43, and 44 intersects with the wheel speed sensor 31, 32, 33, or 34 as a result of the rotation of the wheels 11, 12, 13, and 14.

The controller 70 is configured to register the ID number for each position (front right, front left, rear right, or rear left) of the TPMS transmitters 21, 22, 23, and 24 based on the RSSI information and the ID information outputted from the receiver 52, and the vehicle speed pulse signals outputted from the wheel speed sensors 31, 32, 33, and 34 of the wheels 11, 12, 13 and 14. After e registration of the ID numbers of the TPMS transmitters 21, 22, 23, and 24 of the wheel positions is completed, the controller 70 is configured to monitor the tire air pressure of each wheel and the corresponding wheel positions based on the ID number information and the tire air pressure information outputted from the receiver 52. Then, if a decrease in tire air pressure in at least one of the wheels 11, 12, 13 and 14 is detected, an alarm signal along with the wheel position information is outputted to the display device 61.

The display device 61 is configured to display for the driver whether the tire air pressures have decreased based on the alarm signal and the corresponding wheel position information outputted from the controller 70, and to display the corresponding wheel position when the decrease in the tire air pressure occurred.

Figure 2:
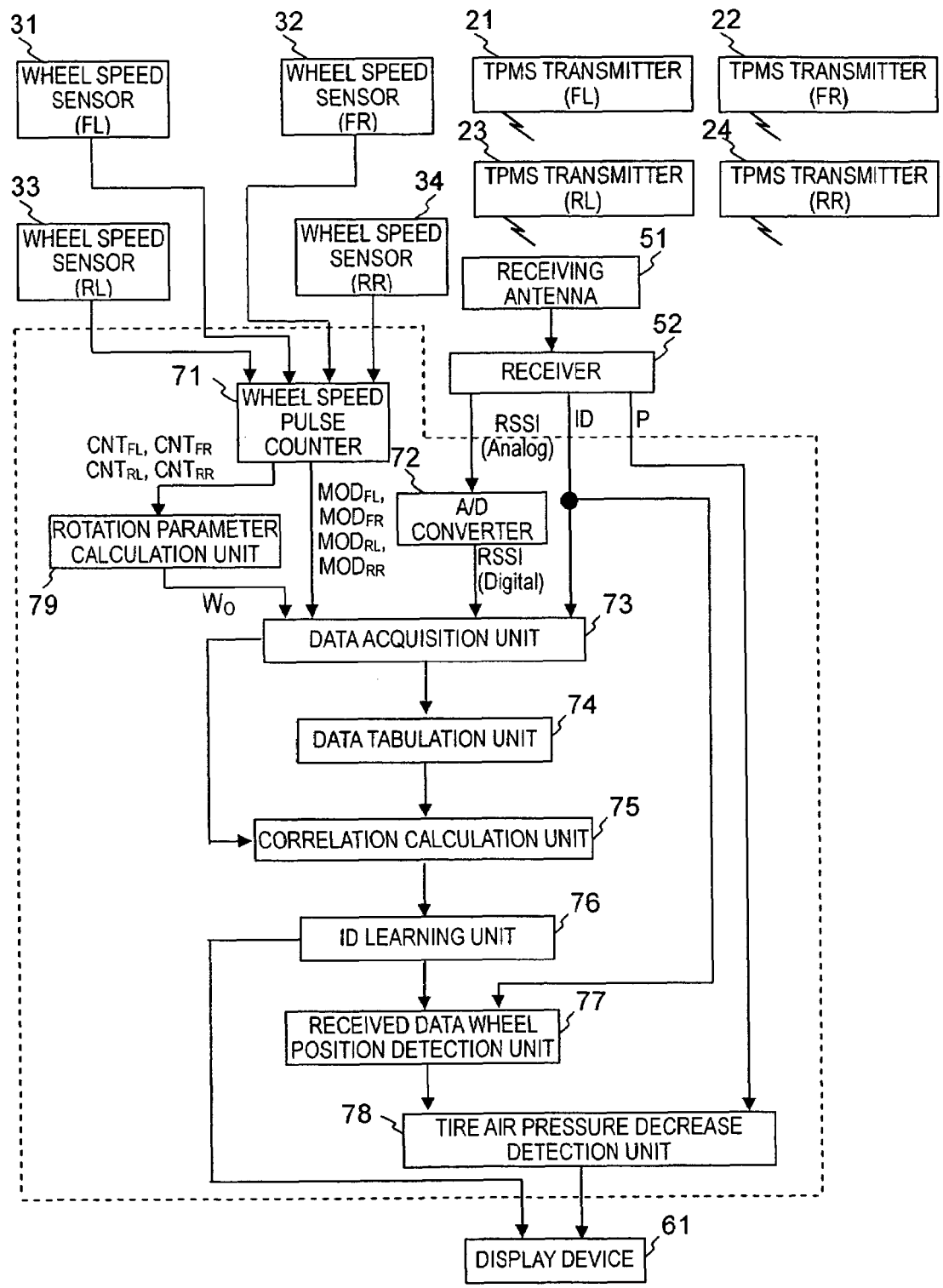
FIG. 2 is a block diagram illustrating the tire air pressure monitoring system in accordance with the first embodiment of the present invention.

FIG. 2 is a block diagram illustrating a detailed configuration of the controller 70 of the tire air pressure alarm system 100 in accordance with the first embodiment of the present invention. Some components in FIG. 2 that are identical to the components illustrated in FIG. 1 are given the same reference numerals, and the descriptions of these components are therefore omitted.

As seen in FIG. 2, the controller 70 preferably includes an A/D converter 72, a wheel speed pulse counter 71, a rotation parameter calculation unit 79, a data acquisition unit 73, a data tabulation unit 74, a correlation calculation unit 75, an ID learning unit 76, a received data wheel position detection unit 77, and a tire air pressure decrease detection unit 78.

More specifically, the controller 70 preferably includes a microcomputer with a tire air pressure monitoring control program that controls the tire air pressure monitoring system as discussed below. The controller 70 can also include other conventional components such as an input interface circuit, an output interface circuit, and storage devices such as a ROM (Read Only Memory) device and a RAM (Random Access Memory) device. The microcomputer of the controller 70 is programmed to control the tire air pressure monitoring system. The memory circuit stores processing results and control programs such as ones for the tire air pressure monitoring operation that are run by the processor circuit. The controller 70 is operatively coupled to the various components of the tire air pressure monitoring system in a conventional manner. The internal RAM of the controller 70 preferably stores statuses of operational flags and various control data. The internal ROM of the controller 70 stores the prescribed data and maps for various operations. The controller 70 is capable of selectively controlling any of the components of the tire air pressure monitoring system in accordance with the control program. It will be apparent to those skilled in the art from this disclosure that the precise structure and algorithms for the controller 70 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The A/D converter 72 is configured to convert the analog quantity of the RSSI information outputted from the receiver 52 to a digital quantity.

The wheel speed pulse counter 71 is configured to count the numbers of wheel speed pulses outputted from the wheel speed sensors 31, 32, 33, and 34 separately for each wheel 11, 12, 13 or 14, to output the values $CNT_{FL}$, $CNT_{FR}$, $CNT_{RL}$, and $CNT_{RR}$ obtained by counting the wheel speed pulses of the wheels 11, 12, 13 and 14, respectively, and to output the remainders $MOD_{FL}$, $MOD_{FR}$, $MOD_{RL}$, and $MOD_{RR}$ obtained by dividing the values $CNT_{FL}$, $CNT_{FR}$, $CNT_{RL}$, and $CNT_{RR}$ by the number N of wheel speed pulses outputted by the wheel speed sensors 31, 32, 33, and 34 per one tire rotation.

The rotation parameter calculation unit 79 is configured to calculate the rotation parameter $W_0$ by the following formula based on the values $CNT_{FL}$, $CNT_{FR}$, $CNT_{RL}$, and $CNT_{RR}$ outputted from the wheel speed pulse counter 71, and to output the calculated result.

$$W_0 = \frac{(CNT_{FL} + CNT_{FR} + CNT_{RL} + CNT_{RR})}{4N}$$

The data acquisition unit 73 is configured to synchronously acquire the rotation parameter $W_0$ outputted from the rotation parameter calculation unit 79, the ID number information outputted from the receiver 52, the remainders $MOD_{FL}$, $MOD_{FR}$, $MOD_{RL}$, and $MOD_{RR}$ outputted from the wheel speed pulse counter 71, and the RSSI digital information outputted from the A/D converter 72.

The data tabulation unit 74 is configured to tabulate the data acquired by the data acquisition unit 73 by the number of reception cycles for each ID number and to stores the result.

The correlation calculation unit 75 is configured to retrieve the data acquired by the data acquisition unit 73 for each ID number with the number of reception cycles that is equal to or greater than a prescribed number from the tabulated data stored in the data tabulation unit 74, and to calculate the RSSI correlation in which the RSSI is grouped based on the values of the remainders $MOD_{FL}$, $MOD_{FR}$, $MOD_{RL}$, and $MOD_{RR}$.

The ID learning unit 76 is configured to learn the wheel position of each of the TPMS transmitters 21, 22, 23, and 24 to which the ID numbers have been assigned based on the RSSI correlation determined by the correlation calculation unit 75.

The received data wheel position detection unit 77 is configured to detect the wheel positions of the received ID numbers by coordinating the ID number information outputted from the receiver 52 and the ID learning information stored in the ID learning unit 76.

The tire air pressure decrease detection unit 78 is configured to monitor the tire air pressure of the wheel 11, 12, 13 or 14 at each wheel position based on the tire air pressure information outputted from the receiver 52 and the wheel position information outputted from the received data wheel position detection unit 77. When a decrease in at least one of the tire air pressures has been detected, the tire air pressure decrease detection unit 78 is configured to output the alarm signal and the corresponding wheel position to the display device 61. Furthermore, the tire air pressure decrease detection unit 78 is configured to output n alarm signal to the display device 61 when it is determined that the radio wave corresponding to a particular wheel position (or positions) has not been received based on the calculation result of the correlation ratio in the ID learning unit 76.

Next, the operation of the tire air pressure monitoring system will be described.

Tire Air Pressure Monitoring Process

FIGS. 3 through 6 are flowcharts describing the control flow of the tire air pressure monitoring routine executed in the controller 70. More specifically, the tire air pressure monitoring routine includes the data acquisition routine, the data tabulation routine, the correlation routine, the ID learning process, and the tire air pressure decrease warning process. These routines and processes are described hereinbelow.

Data Acquisition Routine

Referring now to the flowchart of FIG. 3, the data acquisition routine initiated by turning on the ignition switch of the vehicle will now be described. In other words, in this case, the time at which monitoring begins is the time the ignition is turned on. In step S2 of FIG. 3, the value $CNT_{ID}$ of the reception cycle counter is initialized in the data acquisition unit 73, and the values $CNT_{FL}$, $CNT_{FR}$, $CNT_{RL}$, and $CNT_{RR}$ of the wheel speed pulse counters are initialized in the wheel speed pulse counter 71.

The wheel speed pulse counter 71 is configured to detect the wheel speed pulse signal outputted from the wheel speed sensor 41 of the FL wheel (step S12-1), to increment the value $CNT_{FL}$ of the wheel speed pulse counter of the FL wheel (step S14-1), and to determine the remainder by dividing the value $CNT_{FL}$ of the wheel speed pulse counter of the FL wheel by the number N of wheel speed pulses outputted by the wheel speed sensor 41 of the FL wheel per one tire rotation. This value is substituted for the remainder value $MOD_{FL}$ of the FL wheel (step S16-1). The process then returns to step S12-1, and the steps S14-1 through S16-1 are repeated.

Figure 3:
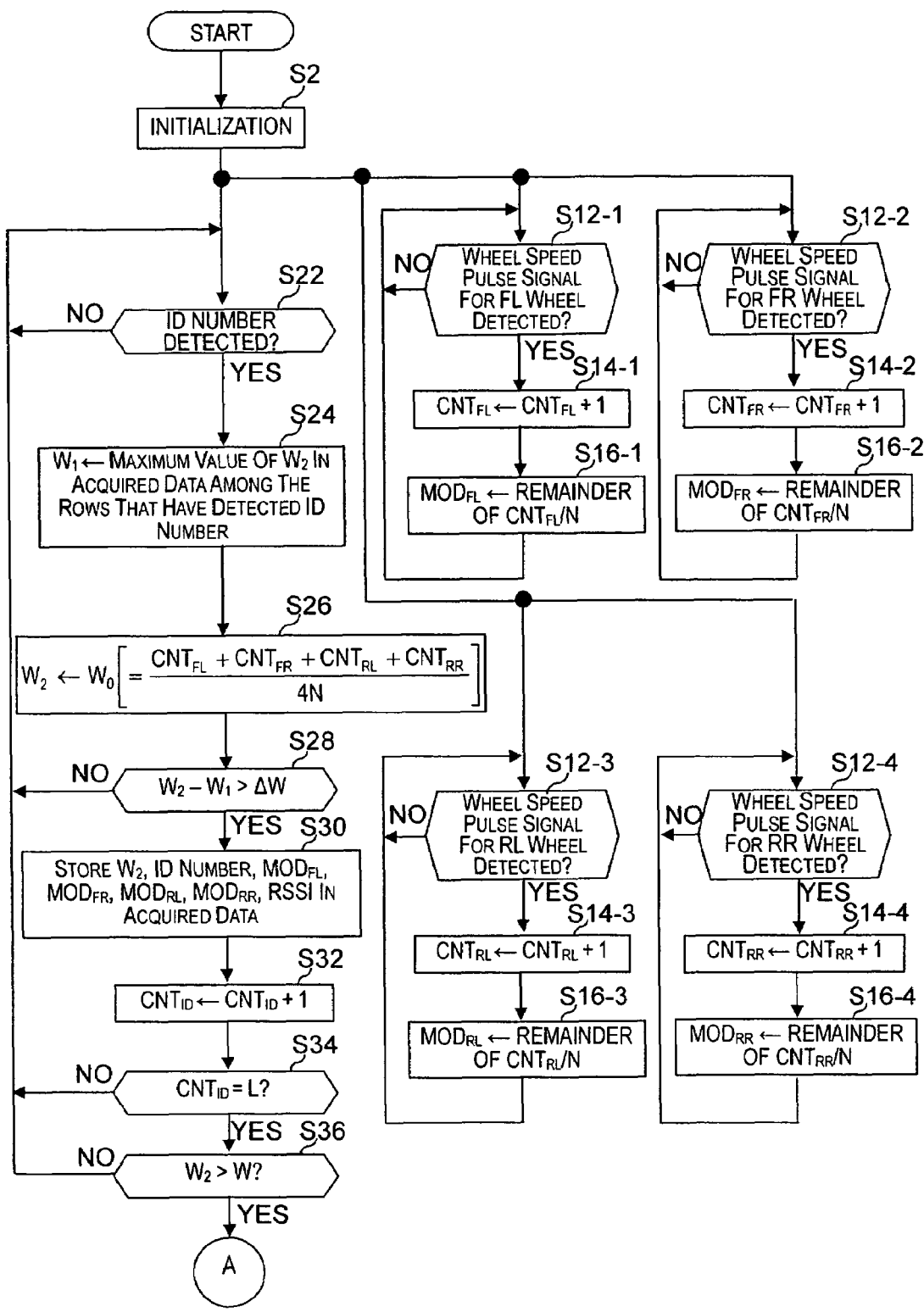
FIG. 3 is a flowchart showing the control flow for a data acquisition routine executed in a controller of the tire air pressure monitoring system in accordance with the first embodiment of the present invention.

The wheels other than the FL wheel, (i.e., the FR wheel, the RL wheel, and the RR wheel) are subjected to the same operation as the FL wheel based on the wheel speed pulse signals outputted from the wheel speed sensors 32, 33, and 34 of each wheel (i.e., step S12-2, step S14-2 and step S16-2 for the FR wheel; step S12-3, step S14-3, and step S16-3 for the RL wheel; step S12-4, step S14-4 and step S16-4 for the RR wheel) as seen in FIG. 3.

In step S22, the data acquisition unit 73 is configured to determine whether the ID number information outputted from the receiver 52 has been detected upon the completion of initialization in step S2, and the process advances to step S24 if the ID number information is detected.

In step S24, the rows that include the detected ID number are retrieved from the series of ID numbers in the acquired data (see FIG. 7) stored in the data acquisition unit 73 which will be described in more detail below. The maximum $W_2$ value is read out from the $W_2$ column of the retrieved rows and this value is substituted for $W_1$. Then, the process advances to step S26. If the ID number is not found in the acquired data that corresponds to the ID number information outputted from the receiver 52, 0 is substituted for $W_1$.

In step S26, the value $W_0$ of the rotation parameter outputted from the rotation parameter calculation unit 79 is substituted for $W_2$, and the process advances to step S28.

In step S28, the value $W_2-W_1$ is calculated to determine whether this value ($W_2-W_1$) is greater than a prescribed value $\Delta W$ (for example, 1.0), and the process advances to step S30 if the value obtained by calculating $W_2-W_1$ is greater than the prescribed value $\Delta W$.

In step S30, it is assumed that the wheel has rotated adequately between the previous reception and the current reception of the radio wave with the corresponding ID number information based on the determination that the value $W_2-W_1$ is greater than the prescribed value $\Delta W$ in step S28. Thus, in step S30, the $W_2$ value, the ID number, the values $MOD_{FL}$, $MOD_{FR}$, $MOD_{RL}$, and $MOD_{RR}$ outputted from the wheel speed pulse counter 71, and the radio wave strength RSSI value outputted from the A/D converter 72 are stored in the acquired data of the data acquisition unit 73. Then, the process advances to step S32.

In step S32, continuing after the storage of the acquired data in step S30, the number of reception cycles number counter $CNT^{ID}$ is incremented and the process advances to step S34.

In step S34, it is determined whether the number of reception cycles has reached a prescribed rotation number L (for example, about 800 rotations), and the process advances to step S36 if the determination in step S34 is Yes, or returns to step S22 if the determination in step S34 is No. In step S36, it is determined whether the value of $W_2$ has reached a prescribed value W (for example, about 800), and the process advances to step S42 if the determination in step S36 is Yes, or returns to step S22 if the determination in step S36 is No.

In other words, steps S22 through S32 are executed until the number of reception cycles reaches the prescribed rotation number L (for example, about 800 rotations), and the value of $W_2$ reaches a prescribed value W (for example, about 800). As a result of steps S22 through S36 being executed, the data is stored as shown in FIG. 7, for example, in the data acquired by the data acquisition unit 73. The data acquisition is completed when the conditions in steps S34 and S36 are fulfilled, and the process advances to the data tabulation routine S42.

In the first embodiment of the present invention, in order to further reduce the required time up to the ID learning time described later, after the ignition is turned on, the trigger wave from the receiver 52 are repeatedly sent out until the required number of reception cycles (for example, about 800 rotations) is reached. Therefore, the data is acquired in a relatively short amount of time.

Data Tabulation Routine

Figure 4A:
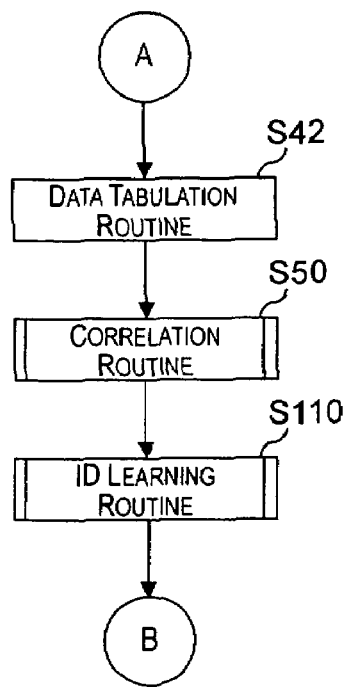
FIGS. 4(a) and 4(b) illustrate a main flowchart of the control flow for a data tabulation routine, a correlation routine, an ID learning routine, and a routine for issuing a tire air pressure decrease alarm executed in the controller of the tire air pressure monitoring system in accordance with the first embodiment of the present invention.

The data tabulation routine executed in the data tabulation unit 74 in step S42 of the flowchart of FIG. 4(a). In the data tabulation routine, the number of reception cycles is tabulated in the data tabulation unit 74 for each ID number from the acquired data stored in the data acquisition unit 73, and the results of this tabulation are stored in the tabulated data of the data tabulation unit 74. As a result of this data tabulation routine, the data is stored as shown in FIG. 8, for example, in the data tabulation unit 74. The process then advances to the correlation routine (step S50 of FIG. 4(a)) when the data tabulation routine (step S42) is completed.

Correlation Routine

The correlation executed in the correlation calculation unit 75 in step S50 of the flowchart of FIG. 4(a). The operation of this correlation routine (step S50) will now be described using the sub-flowchart shown in FIG. 5(a).

In step S52 of the sub-flowchart of FIG. 5(a), the correlation calculation unit 75 is configured to refer to the tabulated data stored in the data tabulation unit 74 and extract the ID numbers for which the number of reception cycles of the wireless signal radio wave reaches a prescribed number of cycles (for example, 10 cycles), and the process advances to step S54. The extracted ID numbers are assigned labels, for example, ID(1), ID(2), ID(k), . . . , ID(M) in ascending order. M is the number of the ID numbers for which the number of reception cycles of the wireless signal radio wave reaches the prescribed number of cycles.

In step S54, the value (k) of the ID counter is set to 1 in the correlation calculation unit 75, and the process advances to step S56.

In step S56, all of the $MOD_{FL}$ and RSSI values in the rows coinciding with the ID number corresponding to the ID number in the label ID(1) in the acquired data stored in the data acquisition unit 73 are extracted. As a result of executing this operation, the data containing the $MOD_{FL}$ and RSSI of all the radio waves with the ID number corresponding to the label ID(1) is obtained, for example, as shown in FIG. 9(a). The process advances to the routine for calculating the correlation ratio in step S58 once the $MOD_{FL}$ and RSSI values are extracted.

The operation of the routine for calculating the correlation ratio (step S58) will now be described using the sub-flowchart shown in FIG. 5(b). In the first embodiment of the present invention, the correlation ratio is calculated as being expressed by a square value of the correlation ratio ($\eta^2$). In these calculations, the MOD$_{FL}$ values and the RSSI values obtained in the previous step are assigned respectively the labels MOD(1), MOD(2), MOD(3), . . . , MOD(M) and the labels RSSI(1), RSSI(2), RSSI(3), . . . , RSSI(M) as shown in FIG. 9(b).

In step S84 of the flowchart of FIG. 5(b), since the MOD value can be any number between 0 and N−1, the fluctuation range of MOD is divided into g number of groups, and the MOD range Xj for the j-th group (j=1, . . . , g) can be expressed by Equation (1) below.

$$\frac{(j-1)N}{g} \leq X_j < \frac{jN}{g} \quad (j=1, \ldots, g) \quad \text{Equation (1)}$$

Thus, the value MOD(i) (where i=1, 2, . . . , M−1, M) which is the component of the data retrieved as, for example, shown in FIG. 9(b) is classified by using Equation (1).

As a result, if the MOD(i) is determined to be classified in the j-th group (step S86), the RSSI(i) that corresponds to the MOD (i) in accordance with the table as shown in FIG. 9(b) is grouped into the j-th group (step S88). Assuming that M pairs (i.e., each pair includes the MOD value and the RSSI value) of the data are classified into g groups in accordance with Equation (1), and assuming mj number of pairs are classified as in the j-th group (j=1, . . . , g), mj and M have the relationship expressed by Equation (2) below.

$$M = \sum_{j=1}^{g} m_j \quad \text{Equation (2)}$$

Then, when the sample data of mj number of the RSSI values that are classified in the j-th group are expressed as {RSSI j(i)|i=1, 2, . . . , mj} (step S90), the average value <RSSIj> of the radio wave strength in the j-th group (j=1, 2, . . . , g) can be calculated according to Equation (3) below (step S92).

$$<RSSI_j> = \frac{1}{m_j}\sum_{j=1}^{m_j} RSSI_j(i) \quad \text{Equation (3)}$$

Then, the average value <RSSI> of all radio wave strengths (all the groups 1 to g) can be calculated according to Equation (4) below (step S94).

$$<RSSI> = \sum_{j=1}^{g} \frac{m_j}{M} <RSSI_j> \quad \text{Equation (4)}$$

The intergroup variance VB is calculated according to Equation (5) below (step S96), and the total variance V$_T$ is calculated according to Equation (6) below (step S98). (For example, refer to "Fundamentals of Quantification [Suryouka ho no kiso]," Hideichi Iwatsubo, Asakura Shoten.)

$$V_B = \frac{1}{M}\sum_{j=1}^{g} m_j(<RSSI_j> - <RSSI>)^2 \quad \text{Equation (5)}$$

$$V_T = \frac{1}{M}\sum_{j=1}^{g}\sum_{i=1}^{m_j} \{RSSI_j(i) - <RSSI>\}^2 \quad \text{Equation (6)}$$

The square value of a correlation ratio ($\eta^2$) is calculated according to Equation (7) below (step S100), and the sub-flowchart of the routine for calculating the correlation ratio is thereby completed.

$$\eta^2 = \frac{V_B}{V_T} \quad \text{Equation (7)}$$

In step S60 of the flowchart of FIG. 5(a), the result of calculating the correlation ratio obtained in the sub-flowchart in FIG. 5(b) is stored as correlation ratio data in the correlation calculation unit 75. Also, the same operation that was performed with the data for the FL wheel in steps S56 through S60 is performed for the FR wheel (steps S62 to S66), the RL wheel (steps S68 to S72), and the RR wheel (steps S74 to S78), respectively.

Furthermore, in step S80, if it is determined that the value k (counter) does not equal M, in step S82, k is incremented to k+1 and the process returns to step S56. In other words, the operation performed for ID(1) in steps S56 through S78 is also performed for ID(2), ID(3), . . . , ID(M) (steps S56 through S78, step S80, step S82).

Once the calculation of the correlation ratio is completed to yield a total of 4×M number of correlation ratio from a combination of the M number of ID numbers and the wheel speed pulse counter values of the four wheels, the sub-flowchart in the correlation routine is completed and the process returns to the main flow shown in FIG. 4(a). As a result of this correlation routine (step S50 of the flowchart of FIG. 4(a)), the correlation ratio data is stored in the correlation calculation unit 75 as, for example, shown in FIG. 10. When the correlation routine (step S50) is completed, the process advances to the ID learning routine (step S110).

ID Learning Routine

The ID learning routine is performed in the ID learning unit 76 in step S110 of the flowchart of FIG. 4(a). The operation of the ID learning routine is described in detail using the sub-flowchart shown in FIG. 6.

In step S112, the ID learning unit 76 is configured to retrieve the column of the ID numbers and the column of the FL wheel correlation ratios (the column of $\eta_{FL}^2$) from the correlation ratio data stored in the correlation calculation unit 75, as shown in, for example, FIG. 10, and to extract the ID number with the maximum square value of the correlation ratio $\eta_{FL}$, whereupon the process advances to step S114.

In step S114, it is determined whether the value of the correlation ratio in step S112 is equal to or greater than a prescribed ratio γ(for example, 0.9), and if the condition is met in step S114, the extracted ID number is stored in the ID registration data as the ID number of the FL wheel (step S116). If this condition is not met in step S114, a warning signal is outputted to the display device 61 on the assumption that a TPMS transmitter may not be mounted on the FL wheel (step S118).

Figure 6:
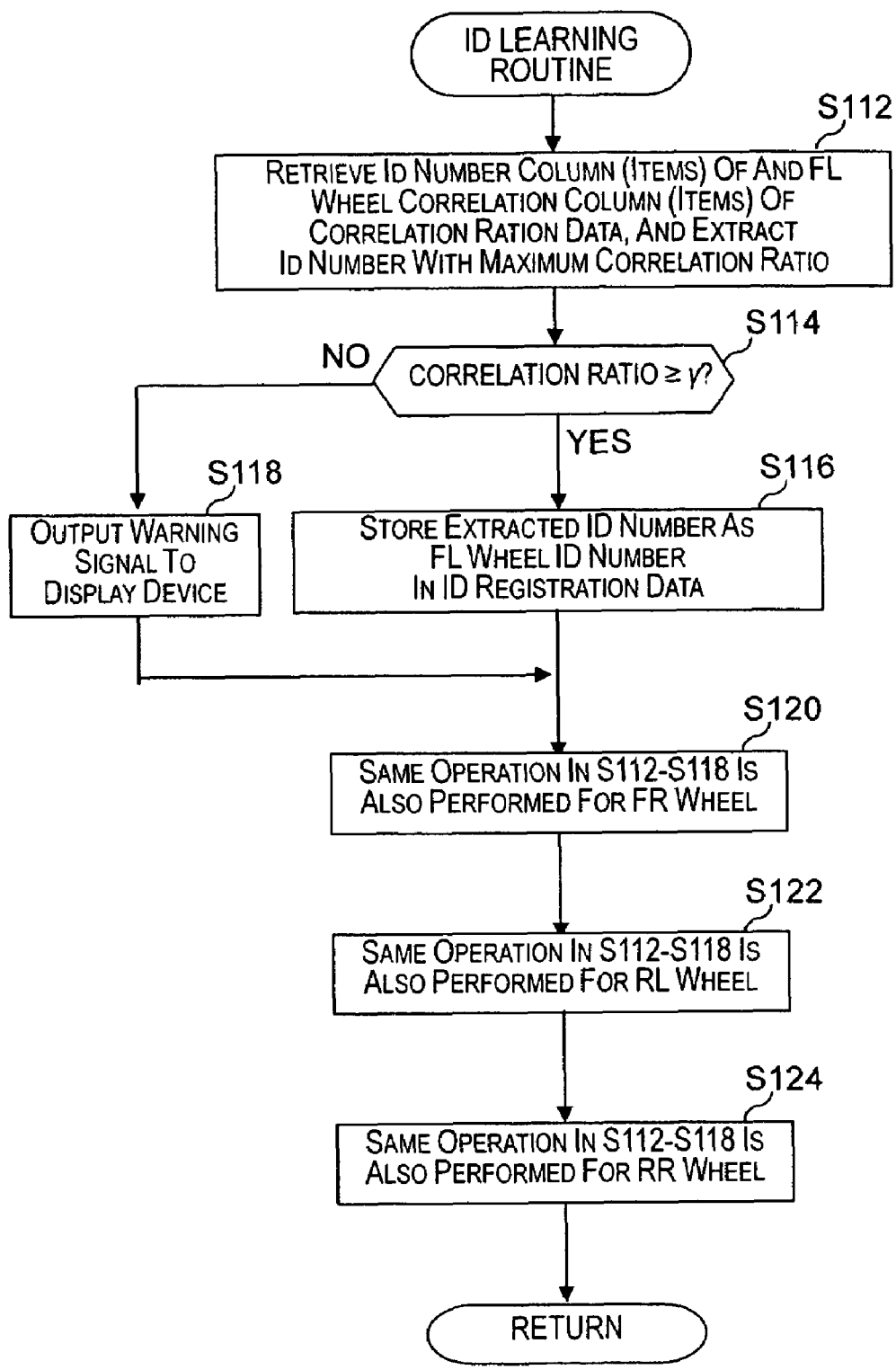
FIG. 6 is a sub-flowchart of the control flow of the ID learning routine executed in the controller of the tire air pressure monitoring system in accordance with the first embodiment of the present invention.

The same operation that was performed for the FL wheel in steps S112 through S118 is then performed for the FR wheel (step S120), the RL wheel (step S122) and the RR wheel (step S124), and the sub-flowchart of the ID learning routine shown in FIG. 6 is completed. As a result of the ID learning routine (step S110) of the flowchart of FIG. 4(a), the data is stored as shown, for example, in FIG. 11 in the ID registration data of the ID learning unit 76. When this ID learning routine shown in FIG. 6 (step S110 of the flowchart of FIG. 4(a)) is completed, the process returns to the main flowchart shown in FIG. 4(a).

Tire Air Pressure Decrease Warning Routine

Referring now to the flowchart of FIG. 4(b), the tire air pressure decrease warning routine executed in the tire air pressure decrease detection unit 78 will be explained. In step S132 of the flowchart of FIG. 4(b), it is determined whether an ID number has been outputted from the receiver 52 and detected in the received data wheel position detection unit 77, and the process advances to step S134 if it is determined that the ID number has been detected in the received data wheel position detection unit 77.

In step S134, the detected ID number is compared to the ID registration data stored in the ID learning unit 76. Then, in step S134, it is determined whether the detected ID number is the ID number that has been already registered for the wheels, and if the ID number coincides with the registered ID number of one of the wheels, the process advances to step S138. In step S138, the wheel position information of the ID number is outputted to the tire air pressure decrease detection unit 78. If the detected ID number does not coincide with any of the registered ID numbers of the wheels in the determination in step S134, it is determined that the detected ID number is the information for another wheel (e.g., the information transmitted from a transmitter coupled to a wheel of a nearby passing vehicle), or information for a spare tire, and the process returns to step S132.

In step S140, the wheel position information outputted from the received data wheel position detection unit 77 and the tire air pressure information (indicated as "P" in FIG. 2) outputted from the receiver 52 are received by the tire air pressure decrease detection unit 78. In step S142, it is determined whether the tire air pressure of the wheel in the outputted position has decreased.

In step S144, if it is determined that the tire air pressure has decreased in step S142, the warning signal corresponding to the wheel position information is outputted to the display device 61, the process then returns again to step S132, and the control flow of steps S1132 onward is repeated. If it is determined in step S1142 that the tire air pressure is normal (i.e., the tire air pressure has not decreased), the process returns again to step S132 and the control flow of steps S132 onward is repeated.

Principles of Wheel Position Estimation

First, the radio waves transmitted from the TPMS transmitters 21, 22, 23, and 24 mounted on the tires 11, 12, 13, and 14, respectively, are propagated as directly transmitted waves and reflected waves that are transmitted after being reflected by the road, the vehicle (including the tires and wheels), or the like. These radio waves are inputted to the receiving antenna 51 after undergoing propagation loss when being propagated through space, reflection loss that occurs when the radio waves are reflected by the road or the vehicle, transmission loss that occurs when the radio waves pass through the vehicle or other such obstacles, or multiple propagation interference that occurs as a result of the phase difference between the direct waves and the reflected waves.

Therefore, the state of the radio wave strength RSSI received by the receiving antenna 51 is roughly determined by the relative positional relationship between the TPMS transmitters 21, 22, 23, and 24, the vehicle, and the receiving antenna 51, and can be set by the rotational angles (hereinafter, tire rotational angle) of the tires 11, 12, 13, and 14 on which the TPMS transmitters 21, 22, 23, and 24, which are the transmission sources of the radio waves, are mounted.

Figure 12:
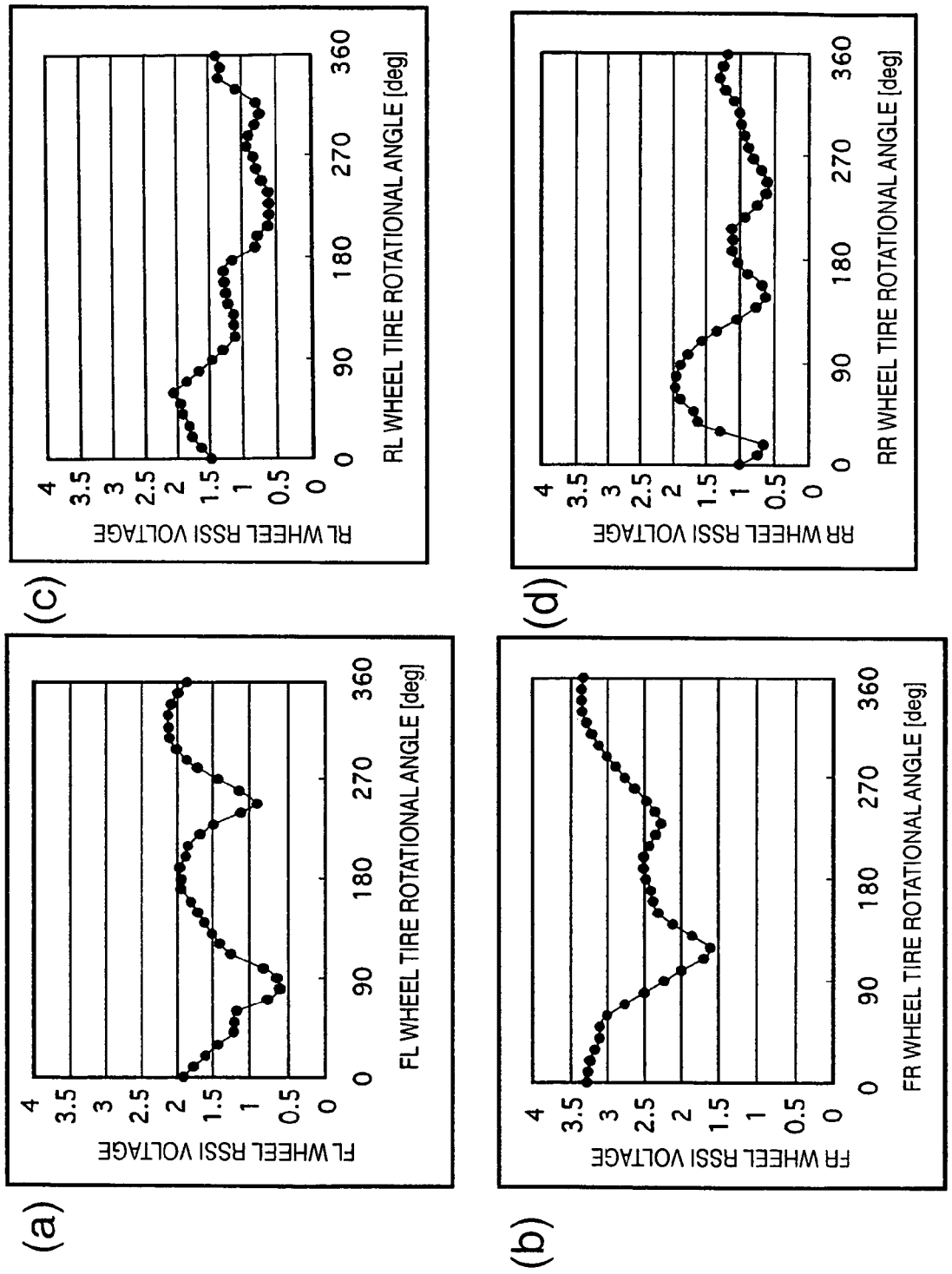
FIG. 12 is a series of diagrams showing examples of the correlation characteristics of the electric wave strength with respect to the tire rotational angles for the four wheels of the vehicle in accordance with the first embodiment of the present invention.

FIG. 12 illustrates a series of diagrams (a) through (d) that represent data showing the dependence of radio wave strength RSSI received by the vehicle-mounted receiving antenna 51 on the tire rotational angle. For wheel positions of the TPMS transmitters 21, 22, 23, and 24, the FL wheel is shown in the diagram (a), the FR wheel is shown in the diagram (b), the RL wheel is shown in the diagram (c), and the RR wheel is shown in the diagram (d) of the FIG. 12. It is clear from these diagrams that the radio wave strength RSSI depends strongly on the tire rotational angle regardless of the wheel positions of the TPMS transmitters 21, 22, 23, and 24 from which the radio waves are transmitted.

Figure 13:
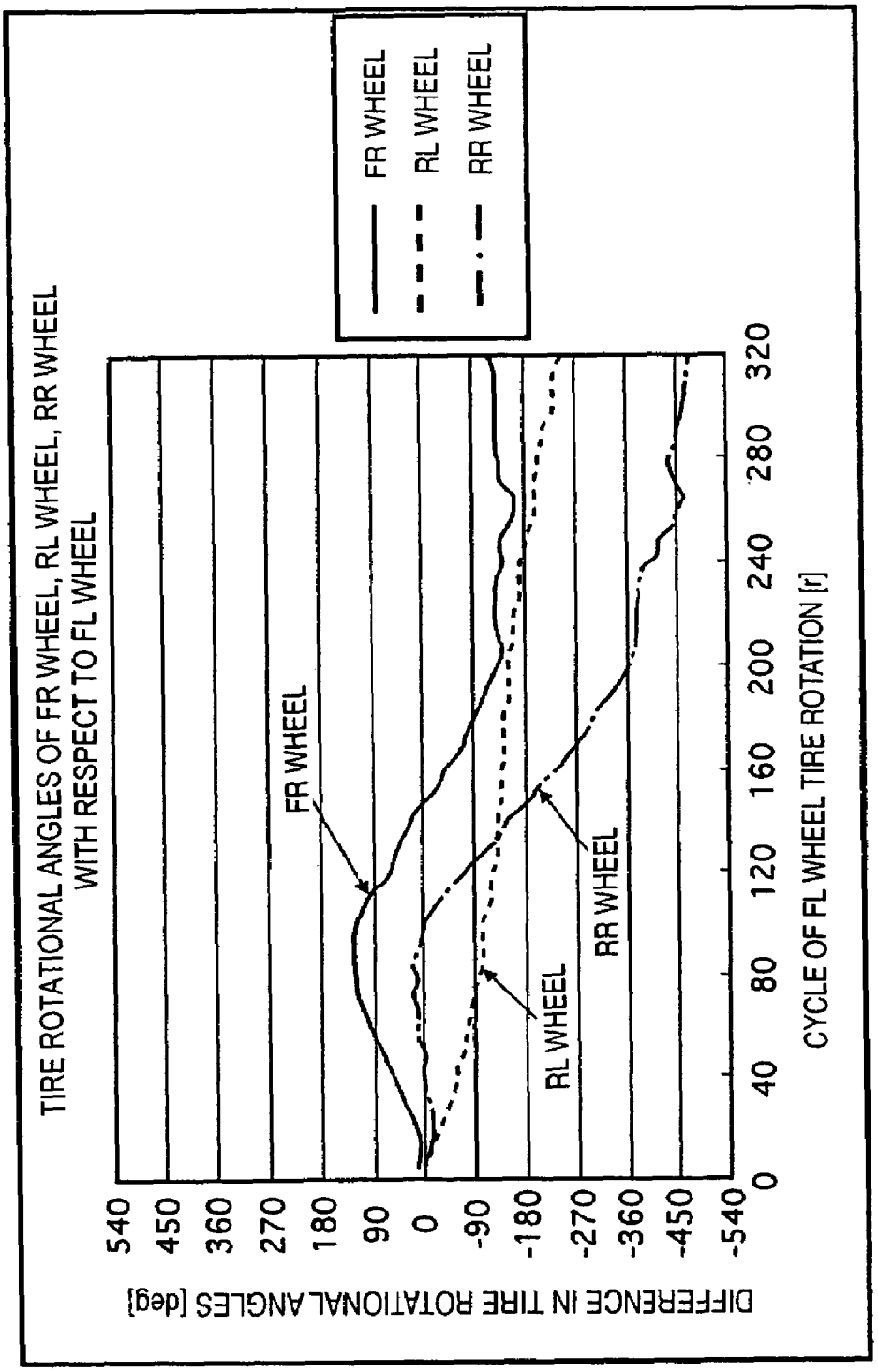
FIG. 13 is a diagram showing the characteristics between the number of rotations of a left front wheel of the vehicle and differences in the rotational angles of the other wheels in accordance with the first embodiment of the present invention.

Moreover, automobiles commonly employ a configuration in which the tires rotate independent of the wheels, and it is believed that rotation of the tires on different wheels is not perfectly in synchronization. FIG. 13 is a diagram illustrating the difference between the tire rotational angle of the FL wheel and the tire rotational angles of the other wheels, specifically, the FR wheel, the RL wheel, and the RR wheel with respect to the FL wheel, when the vehicle is traveling on a normal road. It is clear from FIG. 13 that the difference in tire rotational angles among different wheels varies along with the increase in the number of the tire rotation of the FL wheel, and the rotation of the tires of each wheel is not perfectly in synchronization.

As described above, a radio wave strength RSSI resulting from radio waves transmitted from a transmitter in a certain wheel position can be expected to have a strong correlation with the rotational angle of the tire in that position and have a weak correlation with the rotational angles of tires in other positions, because the radio wave strength RSSI depends on the tire rotational angle, and because the rotation of the wheels of the vehicle are not perfectly synchronous.

Figure 14:
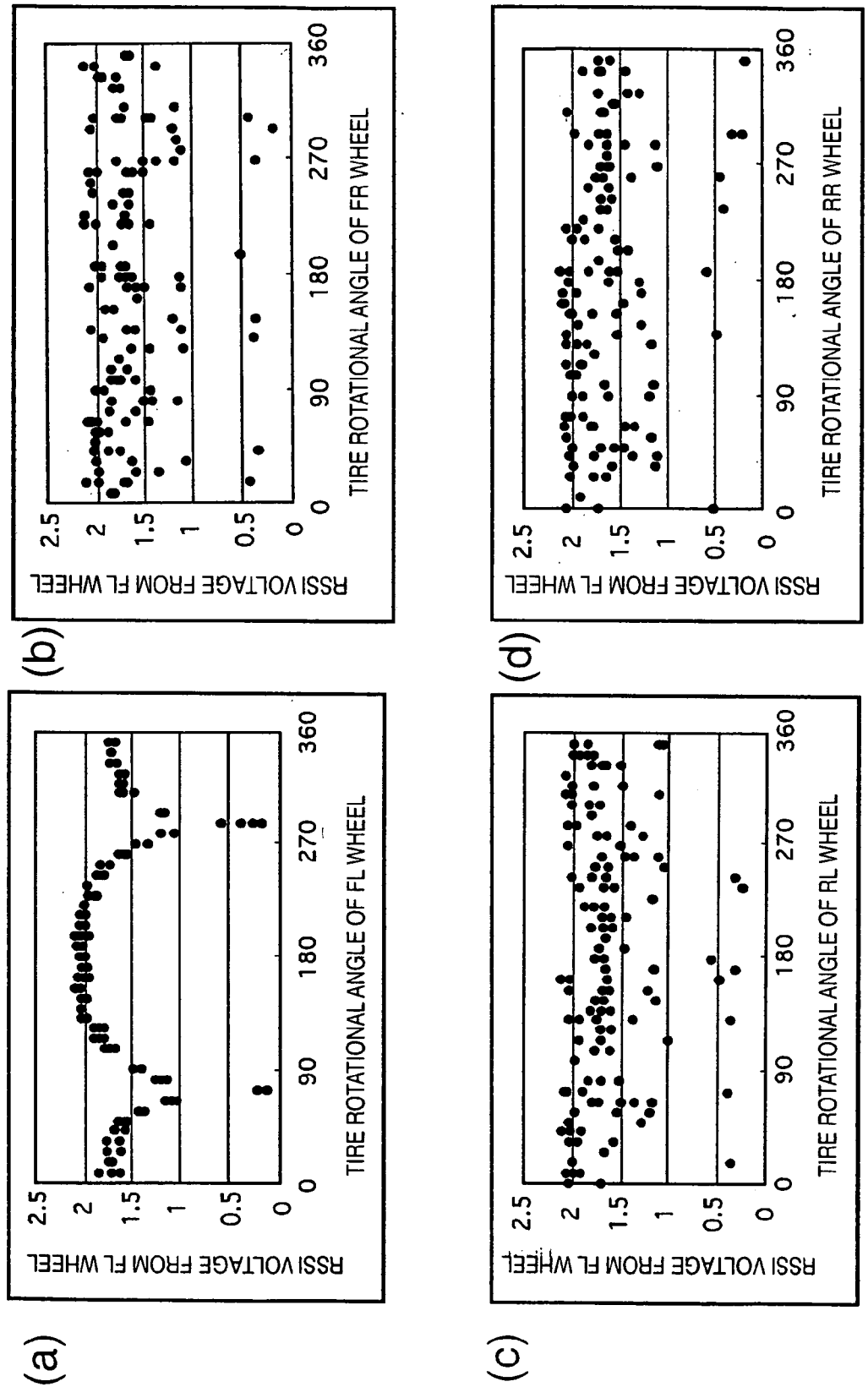
FIG. 14 is a series of diagrams showing an example of the correlation characteristics of the electric wave strength of the electric wave transmitted from the front left wheel with respect to the tire rotational angles of the four wheels of the vehicle in accordance with the first embodiment of the present invention.

For example, FIG. 14 is a series of diagrams (a) through (d) illustrating the results of scatter diagrams of the radio wave strength RSSI obtained based on the radio wave transmitted from the transmitter coupled to the FL wheel and the tire rotational angles of the four wheels (the diagram (a) for the FL wheel, the diagram (b) for the FR wheel, the diagram (c) for the RL wheel, and the diagram (d) for the RR wheel), and correlation is found by using the data such as shown in FIG. 13. It is clear from the diagrams (a) to (d) in FIG. 14 that in the case of the radio wave strength RSSI obtained based on the radio wave from a position of the FL wheel, a highly reproducible scatter diagram (the diagram (a)) can be drawn between the tire rotational angle of the FL wheel. However, nonuniform scatter diagrams with a low reproducibility (the diagrams (b) to (d)) are drawn between the tire rotational angles of the wheels other than the FL wheel (the FR wheel, the RL wheel and the RR wheel).

When such properties are used, and assuming that the radio waves from a certain wheel position are depicted as a scatter diagram (correlation diagram) of the radio wave strength RSSI and the tire rotational angle of the certain wheel, when one of the tire rotation angles of the wheels has a high reproducibility (correlation) with the detected radio wave strength RSSI, the source of the transmission (i.e., the wheel position) can be identified to be that certain position with the wheel whose tire rotational angle has a high correlation with the radio wave strength RSSI.

Thus, the correlation ratio is used in the first embodiment to quantify the strength of the reproducibility (correlation) in such scatter diagrams (correlation diagrams). For example, when the correlation ratios are calculated in cases shown in the diagrams (a) to (d) of FIG. 14, the results are approximately 0.989 in the diagram (a), approximately 0.373 in the diagram (b), approximately 0.247 in the diagram (c), and approximately 0.211 in the diagram. Thus, the extent of reproducibility (correlation) can be quantified.

ID Registration Operation

In the conventional ID number registration operation for estimating positions of the four wheels from which the radio waves are transmitted, the pattern coincidence between the previously stored (past) radio wave strength and the current radio wave strength has been compared in the prior art to estimate the wheel positions. On the other hand, in the first embodiment of the present invention, the correlation (reproducibility) between the current radio wave strength RSSI and the current tire rotational angle is used to estimate the wheel positions. Specifically, in the first embodiment, the ID number registration operation described below is used.

First, in the data acquisition unit 73, the control routine shown in the flowchart in FIG. 3 is executed, and the ID numbers, the radio wave strength RSSI, and the tire rotational angles of the wheels are simultaneously acquired as data for determining the correlation.

The tire rotational angles of the wheels are determined based on the remainders $MOD_{FL}$, $MOD_{FR}$, $MOD_{RL}$, and $MOD_{RR}$ obtained by dividing the wheel speed pulse counter values $CNT_{FL}$, $CNT_{FR}$, $CNT_{RL}$, and $CNT_{RR}$ by the number N of wheel speed pulses outputted by the wheel speed sensors 31, 32, 33, and 34 per one tire rotation continuously from the time that monitoring is initiated. For example, when the wheel speed pulse number N outputted by the wheel speed sensors 31, 32, 33, and 34 is 44 (i.e., the number of sensor rotor teeth) and the wheel speed pulse counter value is 150, the remainder is 18, and this number 18 results in the rotational angle position at which the tire has advanced 18 teeth from the first tooth at the time counting is initiated.

Moreover, the data acquisition unit 73 is configured to perform data acquisition until the number of reception cycles reaches the prescribed number L of rotations (prescribed cycle: for example, 800 rotations), and to acquire the data such as shown in, for example, FIG. 7. Of course, it will be apparent to those skilled in the art from this disclosure that the prescribed number L is not limited to 800, but rather, this number can be set to any number (for example, 400 rotations) as long as the wheel positions can be reliably estimated based on the obtained data.

Next, the data tabulation unit 74 is configured to perform the control routine in step S42 in FIG. 4(a) and to tabulate the number of reception cycles for each ID number from the acquired data stored in the data acquisition unit 73, and to store the tabulated result as tabulated data as shown in, for example, FIG. 8.

Next, the correlation calculation unit 75 is configured to perform the control routine in step S50 in FIG. 4(a) (the sub-flowchart shown in FIGS. 5(a) and 5(b)) is performed, and the tabulated data stored in the data tabulation unit 74 is grouped by the tire rotational angle (MOD) to determine the correlation ratio.

In other words, the correlation calculation unit 75 is configured to refer to the acquired data stored in the data tabulation unit 74, to extract the ID numbers at which the number of reception cycles of the wireless signal radio waves reaches a specified cycle (for example, 10 rotations), to extract all the remainders $MOD_{FL}$, $MOD_{FR}$, $MOD_{RL}$, and $MOD_{RR}$ and values of radio wave strength RSSI for each extracted ID number, and to use the results as the data for calculating the correlation ratio. For example, FIG. 9(a) is an example of data relating to the ID(1) extracted by the correlation calculation unit 75, and FIG. 9(b) is an example of data arranged in numerical order and contrasted with the radio wave strength RSSI values for the remainder $MOD_{FL}$ from among the data pertaining to ID(1).

The correlation calculation unit 75 is then configured to divide the fluctuation range of the tire rotational angles (MOD) into groups (for example, g number of groups) as correlation ratio data for the wheels corresponding to each ID number, to use the average value <RSSIj> of the radio wave strengths RSSIj of the groups and the average value <RSSI> of all the radio wave strengths to calculate the intergroup variance $V_B$ and the total variance $V_T$, and to determine the value of the square ($\eta^2$) of the correlation ratio by dividing the intergroup variance $V_B$ by the total variance $V_T$. The correlation ratio data of the wheels with the corresponding ID numbers is stored as shown in, for example, FIG. 10.

Next, in the ID learning unit 76, the routine in step S110 in FIG. 4(a) (the sub-flowchart shown in FIG. 6) is performed, and the data at which the square value of the correlation reaches a maximum in relation to the ID number is extracted from the correlation ratio data stored in the correlation calculation unit 75. If the square value of the correlation ratio is equal to or greater than the prescribed value γ (for example, 0.9), this ID number is stored in the ID registration data as the ID number for the wheel at which the correlation ratio is the maximum among the other wheels, as shown in FIG. 11, for example.

Therefore, it is possible to identify the wheel positions of the TPMS transmitters 21, 22, 23, and 24, which are the transmission sources of the data received in the receiver 52, even when the position and orientation of the receiving antenna 51 at the time when the voltage pattern is stored vary over time, or the voltage patterns induced in the receiver 52 due to the radio waves from the TPMS transmitters 21, 22, 23, and 24 at both left and right wheel positions are substantially identical when the vehicle shape is horizontally symmetrical and the receiving antenna 51 is placed near a symmetrical axis. Furthermore, situations are avoided in which the ID numbers contained in the radio waves transmitted from the spare tire or the ID numbers contained in the radio waves transmitted from the TPMS transmitters of adjacent vehicles are mistakenly registered.

Tire Air Pressure Decrease Warning Operation

Figure 4B:
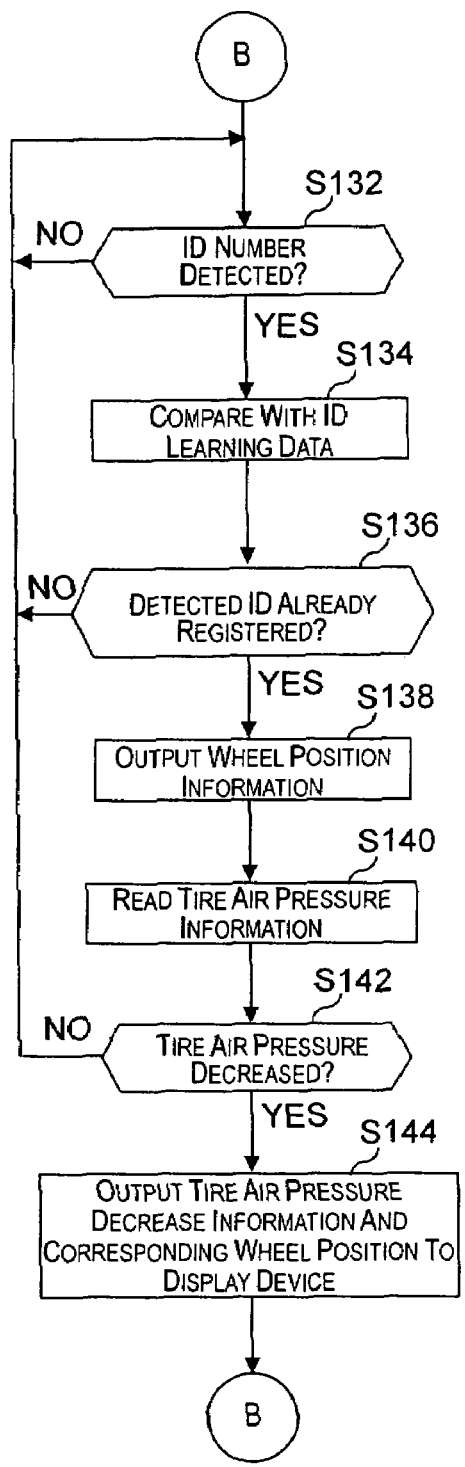
Figure 5:
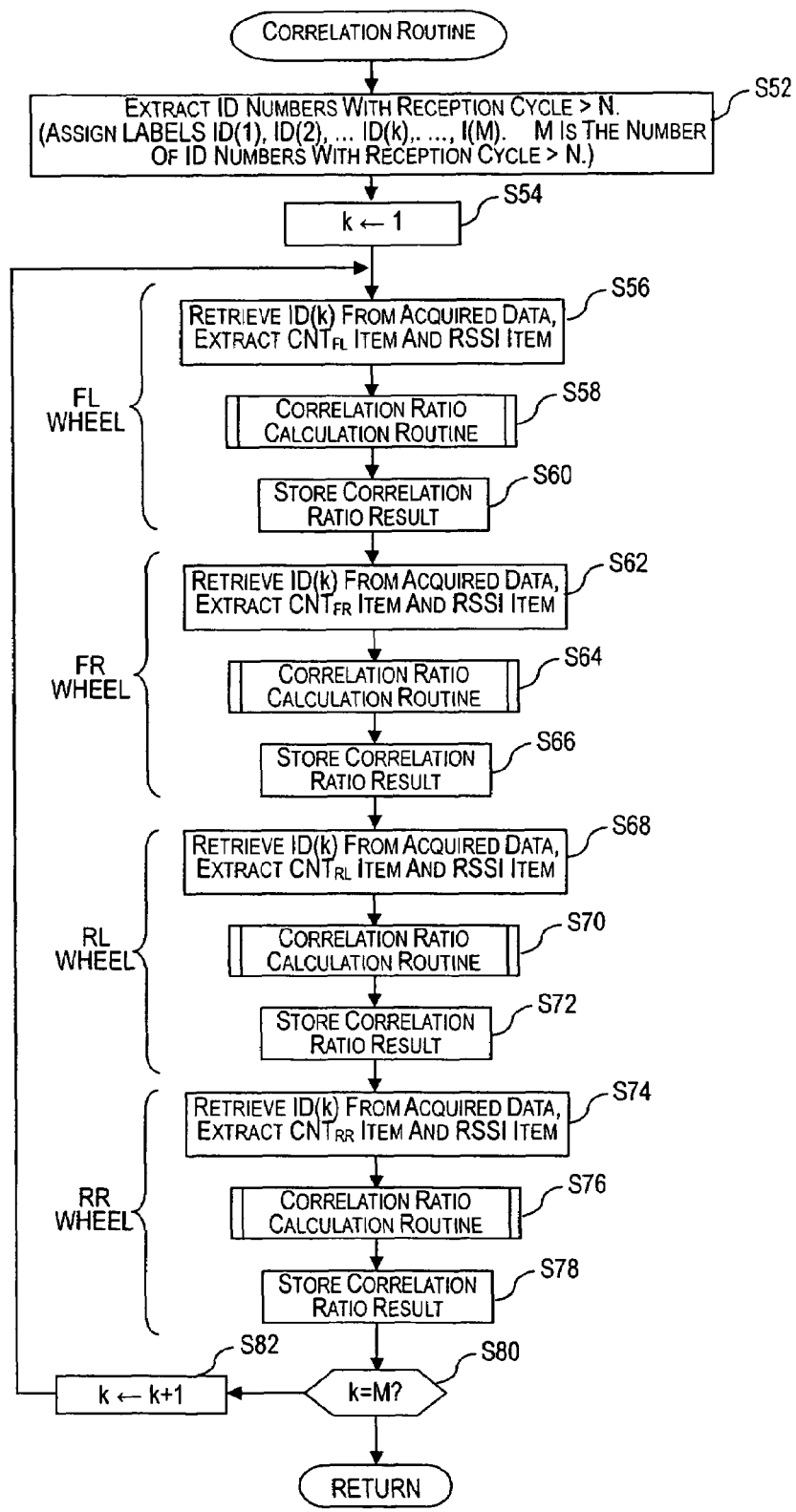
FIG. 5(a) is a sub-flowchart of the control flow for the correlation routine executed in the controller of the tire air pressure monitoring system in accordance with the first embodiment of the present invention.
FIG. 5(b) is a sub-flowchart of the control flow for a routine for calculating a correlation ratio executed in the controller of the tire air pressure monitoring system in accordance with the first embodiment of the present invention.
Figure 5:
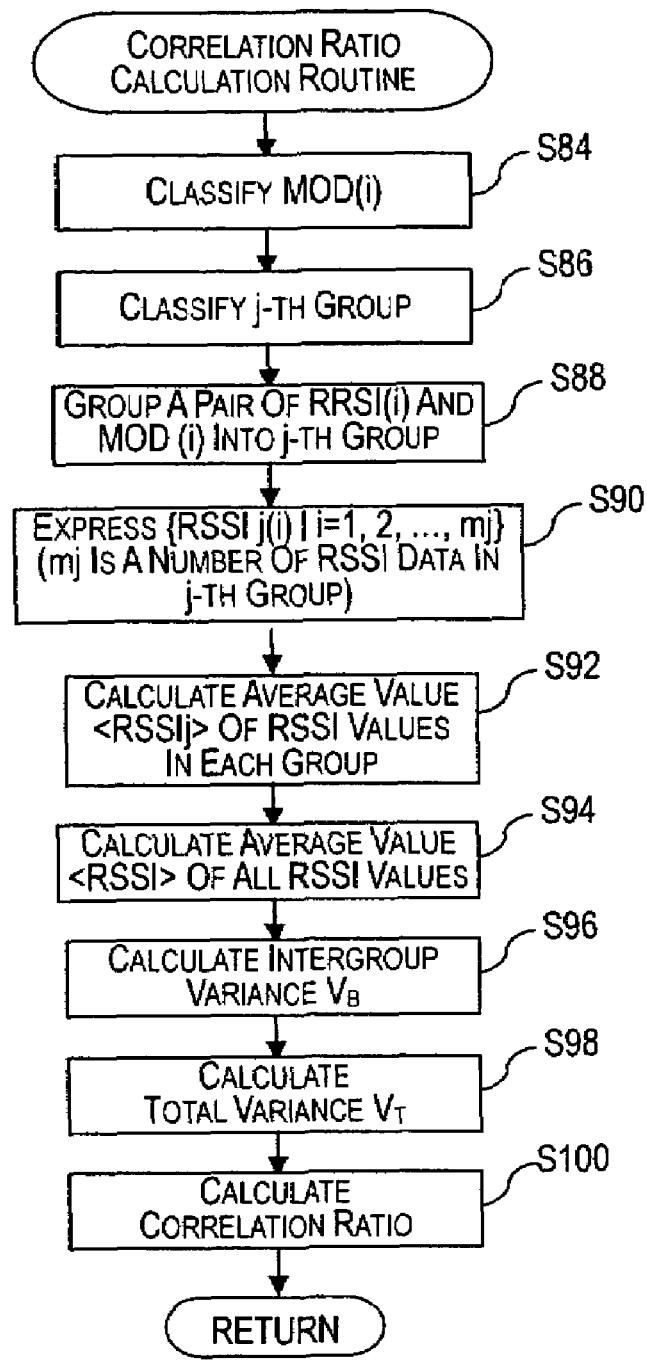

The tire air pressure decrease warning operation in tire air pressure is executed according to the flowchart shown in FIG. 4(b). If it is determined that the ID number outputted from the receiver 52 has been detected by the received data wheel position detection unit 77, the detected ID number is compared with the ID registration data stored in the ID learning unit 76, and if the ID number coincides with one of the registered ID numbers of the wheels, the wheel position information of this ID number is outputted to the tire air pressure decrease detection unit 78. If the detected ID number does not coincide with any of the registered ID numbers, the detected ID number is determined to be the information for a wheel of another vehicle or information for a spare tire, and the process returns to determining whether the ID number outputted from the receiver 52 has been detected.

The wheel position information outputted from the received data wheel position detection unit 77 and the tire air pressure information outputted from the receiver 52 are received by the tire air pressure decrease detection unit 78 to determine whether the tire air pressure of the wheel at that position has decreased. If it is determined that the tire air pressure has decreased, the warning signal corresponding to the wheel position information is outputted to the display device 61.

Therefore, by estimating the wheel position based on the extent of the correlation (reproducibility) between the radio wave strength and the tire rotational angle, a highly precise, less error-inducing ID registration system can be obtained. Thus, the driver or any passengers can be quickly informed as to which wheel has a reduced tire air pressure by the warning signal and the wheel position information from the display device 61 when, for example, the tire air pressure has decreased while the vehicle is moving.

In the tire air pressure monitoring system according to the first embodiment, the effects given as examples below can be obtained.

(1) The tire air pressure monitoring system of the present invention comprises a plurality of transmitters (21, 22, 23 and 24), a receiver 52, and a tire identification number registration device (the controller 70). The transmitters are mounted on the wheels of the vehicle and designed for transmitting detected tire air pressure information via wireless signal radio waves along with uniquely assigned identification numbers. The receiver is mounted on the vehicle side and designed for receiving the wireless signal radio waves transmitted from the transmitters. The tire identification number registration device is configured to estimate the wheel positions based on the received radio waves from the receivers and registering the tire identification numbers of the wheel positions. In the present invention, the tire identification number registration device is configured to estimate the wheel positions transmitted by the wireless signal radio waves based on the extent of the correlation between the radio wave strength and the tire rotational angles. Therefore, there is no need to store the variation pattern of the radio wave strength in advance, and it is possible to reliably estimate the wheel positions even if various tires or wheels with different shapes or materials are mounted.

(2) The tire identification number registration device has a data acquisition unit 73 configured to synchronously acquire data for determining the correlation including the tire identification numbers, the radio wave strength, and the tire rotational angles of the wheels. Therefore, the tire identification numbers indicating the wheel positions, and the radio wave strength and tire rotational angles for determining the correlation can be acquired as unified and integrated data needed to ensure precision in estimating the wheel positions.

(3) The data acquisition unit 73 of the tire identification number registration device is configured to determine the tire rotational angles of the wheels according to the remainders $MOD_{FL}$, $MOD_{FR}$, $MOD_{RL}$, and $MOD_{RR}$ obtained by dividing the values $CNT_{FL}$, $CNT_{FR}$, $CNT_{RL}$, and $CNT_{RR}$ of the wheel speed pulse counter continuously counted from the time when monitoring starts by the number N of wheel speed pulses outputted by the wheel speed sensors 31, 32, 33, and 34 per tire rotation. Therefore, it is possible to precisely obtain the tire rotational angle information whose angle resolution is based on the pulse numbers of the wheel speed sensors 31, 32, 33, and 34 without separately adding a sensor for detecting the tire rotational angles.

(4) The data acquisition unit 73 of the tire identification number registration device is configured to execute data acquisition until the number of reception cycles of the wireless signal radio waves reaches a prescribed number of cycles. Therefore, it is possible to acquire the data needed to ensure high precision in estimating the wheel positions by determining the correlation.

(5) The tire identification number registration device has a data tabulation unit 74 configured to tabulate the number of reception cycles of the wireless signal radio waves for each tire identification number from the acquired data stored in the data acquisition unit 73, and to store the tabulated results as tabulated data. Therefore, it is possible to easily check whether the amount of data needed to determine the correlation is present for each tire identification number.

(6) The tire identification number registration device has a correlation calculation unit 75 configured to determine the correlation ratio by grouping the tabulated data stored in the data tabulation unit 74 by tire rotational angles. Therefore, the correlation between the variation in radio wave strength and the tire rotational angles of each wheel can be quantified, and it is possible to effectively determine the estimated positions of the four wheels.

(7) The correlation calculation unit 75 of the tire identification number registration device is configured to refer to the tabulated data stored in the data tabulation unit 74, to extract the tire identification numbers at which the number of reception cycles of the wireless signal radio waves has reached a prescribed number of cycles, to extract the values of all the tire rotational angles and radio wave strengths for each extracted tire identification number, and to use these values as data for calculating the correlation ratio. Therefore, it is possible to determine the estimated positions of the four tires with high precision.

(8) The correlation calculation unit 75 of the tire identification number registration device is configured to determine the square value ($\eta^2$) of the correlation ratio as the correlation ratio data for the wheels corresponding to the tire identification numbers by dividing the fluctuation range of the tire rotational angles (MOD) into a plurality of groups (for example, g number of groups), using the average value <$RSSI_j$> of radio wave strengths $RSSI_j$ in these groups and the average value <RSSI> of all radio wave strengths to calculate the intergroup variance $V_B$ and the total variance $V_T$, and dividing the intergroup variance $V_B$ by the total variance $V_T$. Therefore, the correlation (reproducibility) between the change in radio wave strength and the tire rotational angle of each wheel can be expressed by a quantified value.

(9) The tire identification number registration device has the ID learning unit 76 in which the data at which the square value of the correlation ratio reaches the maximum in relation to the tire identification numbers is extracted from the correlation ratio data stored in the correlation calculation unit 75, and the identification numbers are stored in the ID registration data as the identification numbers of the wheels at which the correlation ratio reaches the maximum when the square value of the correlation ratio is equal to or greater than a prescribed value. Therefore, the ID registration data for the wheels can be obtained with high precision by a simple comparison and determination of two simple values.

(10) The receiver 52 on the vehicle side has a circuit for sending out trigger waves from the receiving antenna 51 according to the data requirements, and each of the TPMS transmitters 21, 22, 23, and 24 on the wheel side has a circuit that can send back tire air pressure information and/or temperature information with the ID number by the triggers waves sent out from the antenna without the use of a battery. Therefore, it is possible to achieve the maximum data acquisition needed to estimate the wheel positions with high precision in a short amount of time and without concerning over the life of the battery.

Second Embodiment

Figure 15:
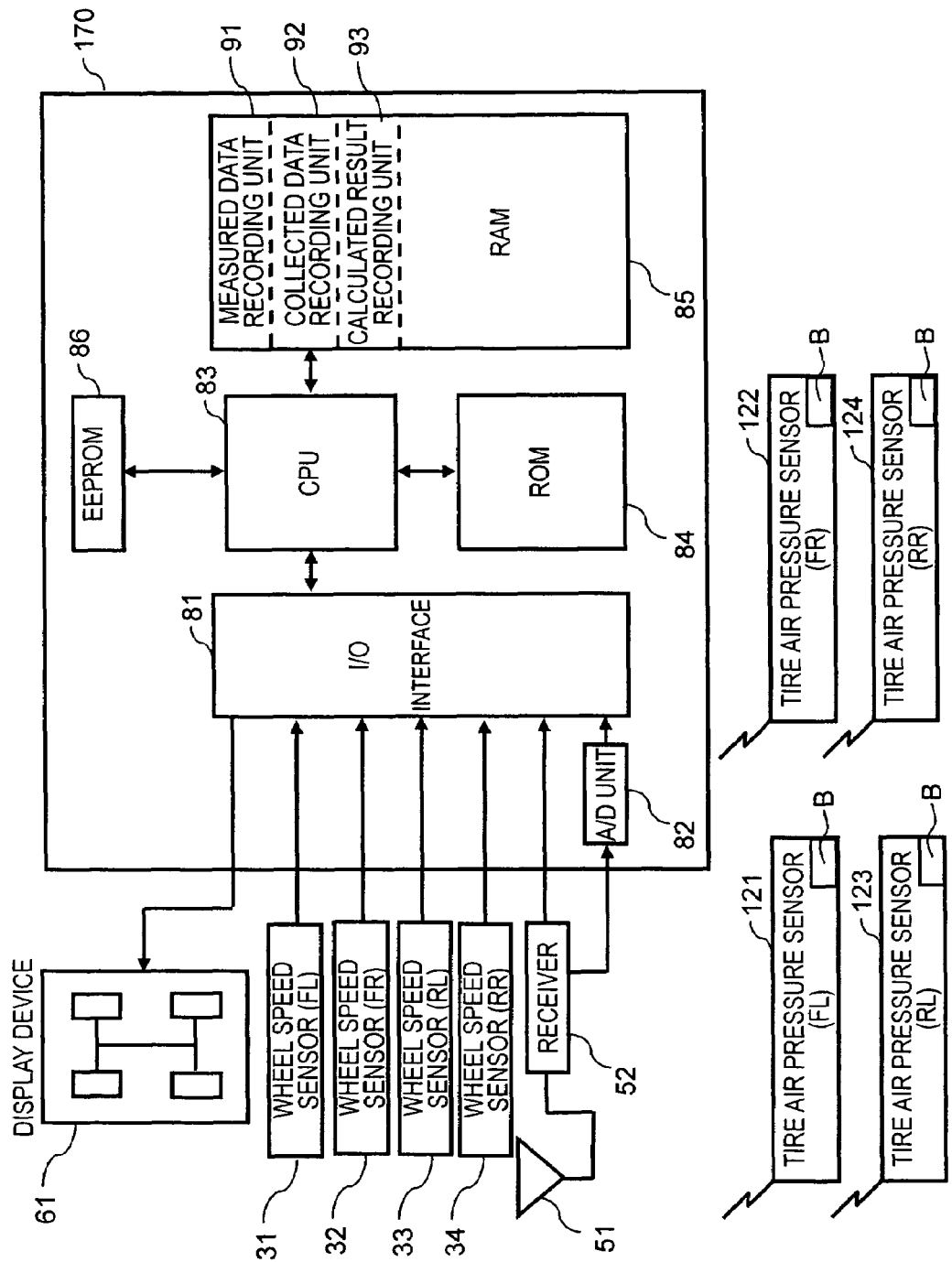
FIG. 15 is a block diagram of a tire air pressure monitoring system in accordance with a second embodiment of the present invention.

Referring now to FIG. 15, a tire air pressure monitoring system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The tire air pressure monitoring system of the second embodiment is basically identical to the tire air pressure monitoring system of the first embodiment except that a plurality of tire air pressure sensors 121 to 124 instead of the transmitters 21 to 24 of the first embodiment. More specifically, each of the tire air pressure sensors 121 to 124 includes a transmitter that is configured to generate a signal itself using power from a battery B and to transmit pressure data and the like at prescribed intervals while the vehicle is stopped or moving.

As shown in FIG. 15, the vehicle equipped with the tire air pressure monitoring system of the second embodiment is provided with the FL tire air pressure sensor 121, the FR tire air pressure sensor 122, the RL tire air pressure sensor 123, the RR tire air pressure sensor 124, the FL wheel speed sensor 31, the FR wheel speed sensor 32, the RL wheel speed sensor 33, the RR wheel speed sensor 34, the receiving antenna 51, the receiver 52, the display device 61, and a controller 170, as shown in FIG. 15.

Each of the tire air pressure sensors 121, 122, 123, and 124 is preferably mounted on a valve unit of the respective wheel, and is preferably provided with the battery B, a pressure sensor, a centrifugal switch, a receiver, an IC, and the like. Each of the tire air pressure sensors 121, 122, 123 and 124 is configured to generate a signal based on a switch signal from the centrifugal switch. As a result of this signal, tire air pressure information is outputted together with the ID information. The battery consumption is reduced by increasing the transmission interval when the vehicle is stopped or is moving slowly at a speed lower than a prescribed speed, and shortening the transmission interval when the vehicle is moving at a speed that exceeds the prescribed speed.

As seen in FIG. 15, the controller 170 preferably has an I/O interface 81, an A/D unit 82, a CPU 83, ROM 84, RAM 85, and EEPROM 86. In the second embodiment of the present invention, the RAM 85 of the controller 170 preferably has a measured data recording unit 91 that performs part of or all of the functions of the rotation parameter calculation unit 79, the data acquisition unit 73, and the data tabulation unit 74 of the first embodiment. The RAM 85 also preferably includes a collected data recording unit 92 and a calculation result recording unit 93. The rest of the configuration of the tire air pressure monitoring system of the second embodiment is similar to the configuration of the first embodiment, and thus, descriptions thereof are omitted.

The operation of the second embodiment will now be described. In the tire air pressure monitoring system in the second embodiment, a longer running time is required to acquire the data needed to determine the correlation comparing to the first embodiment. Therefore, in the second embodiment, the ID learning time can be reduced by reducing the number (g) of divisions as given by Equation (1) explained above, and also by reducing the value of L (for example, reducing by half) in step S34 in the flowchart in FIG. 3. The rest of the operation is basically identical to the first embodiment, and descriptions thereof are omitted.

In the tire air pressure monitoring system in the second embodiment, the following effects can be obtained in addition to the effects (1) through (9) in the first embodiment.

(11) The tire air pressure sensors 121, 122, 123, and 124, which are also the transmitters on the wheel side, are configured to transmit tire air pressure information with prescribed intervals along with the tire identification numbers using a battery power source (from the battery B). Therefore, the wheel positions of the transmission sources can be estimated based on the extent of the correlation between the radio wave strength and the tire rotational angles even while using conventional tire air pressure sensors 121, 122, 123, and 124.

In the second embodiment, an example with a reduced number (g) of divisions given by formula (1) and a lower value of L as the number of acquired pieces of data are given as the method of reducing the ID learning time, but the ID learning time can be reduced by, for example, dividing the tire rotational angle (360°) into a plurality of regions by using angles of fixed width whose correlation with the radio wave strength can be determined, and the correlation is determined at the time when the number of data pieces included in one of the divided regions reaches a prescribed number as a result of data being unevenly distributed.

Although the vehicle having four wheels are used to explain the tire air pressure monitoring system of the first and second embodiments of the present invention, it will be apparent to those skilled in the art from this disclosure that the tire air pressure monitoring system of the present invention can be applied to a vehicle with any number of wheels (e.g., two, three, five or more).

Therefore, in the tire air pressure monitoring system of the present invention, the tire identification number registration device is configured to estimate the wheel positions transmitted by the wireless signal radio waves based on the extent of the correlation (reproducibility) between the radio wave strength and the tire rotational angles. Specifically, since the radio wave strength of radio waves from a certain wheel position depends on a tire rotational angle of the certain wheel position, and since the wheels of the vehicle do not rotation in synchronization, a strong correlation can be obtained between the tire rotational angle of a wheel at a certain position and the radio wave strength of the radio wave transmitted from the certain position, and a weak correlation can be obtained between the tire rotational angles of other wheels at other positions and the radio wave strength of the radio wave transmitted from the certain position. As a result, there is no need to store the variation pattern of the radio wave strength in advance, and the wheel position can be reliably estimated even if various tires or wheels with different shapes or materials are mounted.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A tire air pressure monitoring system comprising:
   a transmitting device mounted on a wheel of a vehicle, and configured and arranged to wirelessly transmit a signal indicative of at least tire air pressure information of a tire coupled to the wheel and a tire identification number assigned to the wheel;
   a receiving device mounted on the vehicle, and configured and arranged to receive the signal transmitted from the transmitting device; and
   a tire identification number registration device configured to estimate a position of the wheel with respect to the vehicle based on correlation information corresponding to an extent of a correlation between strength of the signal received in the receiving device and a tire rotational angle of the wheel, and to register the tire identification number with the position of the wheel with respect to the vehicle.

2. The tire air pressure monitoring system as recited in claim 1, wherein
   the tire identification number registration device includes a data acquisition unit configured to synchronously acquire the tire identification number, the strength of the signal, and the tire rotation angle for determining the correlation information.

3. The tire air pressure monitoring system as recited in claim 2, wherein
   the data acquisition unit of the tire identification number registration device is configured to determine the tire rotational angle of the wheel according to a remainder value obtained by dividing a number of wheel speed pulses outputted by a wheel speed sensor continuously since monitoring of rotation of the wheel started by a number of wheel speed pulses outputted by the wheel speed sensor with one tire rotation.

4. The tire air pressure monitoring system as recited in claim 2, wherein
   the data acquisition unit of the tire identification number registration device is configured to execute data acquisition until a number of reception cycle of the signal received by the receiving device reaches a prescribed number.

5. The tire air pressure monitoring system according to claim 2, wherein
   the tire identification number registration device has a data tabulation unit configured to tabulate a number of reception cycle of the signal for each of the tire identification numbers received in the receiving device based on data acquired and stored in the data acquisition unit, and to store a result as tabulated data.

6. The tire air pressure monitoring system as recited in claim 5, wherein
   the tire identification number registration device has a correlation calculation unit configured to calculate a value indicative of a correlation ratio by grouping the tabulated data stored in the data tabulation unit based on the tire rotational angle.

7. The tire air pressure monitoring system as recited in claim 6, wherein
   the correlation calculation unit of the tire identification number registration device is configured to extract the tire identification numbers with the number of reception cycle of the signal that is equal to or greater than a prescribed number from the tabulated data stored in the data tabulation unit, and to extract all values of the tire rotational angles and the strength of the signal for each of the extracted tire identification numbers to calculate the correlation ratio for each of the extracted tire identification numbers.

8. The tire air pressure monitoring system as recited in claim 6, wherein
   the correlation calculation unit of the tire identification number registration device is configured to obtain correlation data including a collection of square values of the correlation ratio calculated for each of the extracted tire identification numbers by dividing a fluctuation range of the tire rotational angle of the wheel into a plurality of groups, calculating an intergroup variance and a total variance based on an average value of the strength of the signal of each group and an average value of the strength of the signal of all the groups, and dividing the intergroup variance by the total variance.

9. The tire air pressure monitoring system as recited in claim 8, wherein
   the tire identification number registration device has an ID learning unit configured to extract an identification number with a maximum square value of the correlation ratio from the correlation data stored in the correlation calculation unit, and to store the identification number in the ID registration data as an identification number of the wheel when the maximum square value of the correlation ratio is equal to or greater than a prescribed value.

10. The tire air pressure monitoring system according to claim 1, wherein
the receiving device coupled to the vehicle is configured and arranged to send out trigger wave from an antenna according to data requirements, and
the transmitting device coupled to the wheel is configured to send back the tire air pressure information and the tire identification number by the trigger wave sent out from the antenna without using a battery power source.

11. The tire air pressure monitoring system according to claim 1, wherein
the transmitting device coupled to the wheel is configured and arranged to transmit the tire air pressure information and the tire identification number at prescribed intervals by using a battery power source.

12. The tire air pressure monitoring system as recited in claim 3, wherein
the data acquisition unit of the tire identification number registration device is configured to execute data acquisition until a number of reception cycle of the signal received by the receiving device reaches a prescribed number.

13. The tire air pressure monitoring system according to claim 12, wherein
the tire identification number registration device has a data tabulation unit configured to tabulate the number of reception cycle of the signal for each of the tire identification numbers received in the receiving device based on data acquired and stored in the data acquisition unit, and to store a result as tabulated data.

14. The tire air pressure monitoring system as recited in claim 13, wherein
the tire identification number registration device has a correlation calculation unit configured to calculate a value indicative of a correlation ratio by grouping the tabulated data stored in the data tabulation unit based on the tire rotational angle.

15. The tire air pressure monitoring system as recited in claim 14, wherein
the correlation calculation unit of the tire identification number registration device is configured to extract the tire identification numbers with the number of reception cycle of the signal that is equal to or greater than a prescribed number from the tabulated data stored in the data tabulation unit, and to extract all values of the tire rotational angles and the strength of the signal for each of the extracted tire identification numbers to calculate the correlation ratio for each of the extracted tire identification numbers.

16. The tire air pressure monitoring system as recited in claim 15, wherein
the correlation calculation unit of the tire identification number registration device is configured to obtain correlation data including a collection of square values of the correlation ratio calculated for each of the extracted tire identification numbers by dividing a fluctuation range of the tire rotational angle of the wheel into a plurality of groups, calculating an intergroup variance and a total variance based on an average value of the strength of the signal of each group and an average value of the strength of the signal of all the groups, and dividing the intergroup variance by the total variance.

17. The tire air pressure monitoring system as recited in claim 16, wherein
the tire identification number registration device has an ID learning unit configured to extract an identification number with a maximum square value of the correlation ratio from the correlation data stored in the correlation calculation unit, and to store the identification number in the ID registration data as an identification number of the wheel when the maximum square value of the correlation ratio is equal to or greater than a prescribed value.

18. A tire air pressure monitoring system comprising:
transmitting means for wirelessly transmitting signal indicative of at least tire air pressure information of a tire coupled to a wheel of a vehicle and a tire identification number assigned to the wheel;
receiving means for receiving the signal transmitted from the transmitting means; and
tire identification number registering means for estimating a position of the wheel with respect to the vehicle based on correlation information corresponding to an extent of a correlation between strength of the signal received in the receiving means and a tire rotational angle of the wheel, and to register the tire identification number with the position of the wheel with respect to the vehicle.

19. A method of monitoring tire air pressure comprising:
wirelessly transmitting signal indicative of at least tire air pressure information of a tire coupled to a wheel of a vehicle and a tire identification number assigned to the wheel;
receiving the signal that was transmitted;
obtaining correlation information corresponding to an extent of a correlation between strength of the signal and a tire rotational angle of the wheel;
estimating a position of the wheel with respect to the vehicle based on the correlation information; and
registering the tire identification number with the position of the wheel with respect to the vehicle.

* * * * *